United States Patent Office 2,987,555
Patented June 6, 1961

2,987,555
O-(HYDROXYALKYLATED)PHENOLS
Billy D. Davis, Clute, Tex., assignor to The Dow Chemical Company, Midland Mich., a corporation of Delaware
No Drawing. Filed Dec. 2, 1957, Ser. No. 699,917
3 Claims. (Cl. 260—613)

The present invention relates to hydroxyalkylated phenols and is more particularly concerned with a novel process for their preparation.

The prior art processes usually have high conversion but low yields due to high loss of product during purification. The product usually produced in the known processes has very poor color, chemical stability and physical properties and without purification is not suitable for commercial use in fiber, film or laminate fields. Further the reactions of the processes take from 20 hours to several days.

It is therefore an object of the present invention to provide a process for the production of hydroxyalkylated phenols which materially shortens the reaction time. Another object of the present invention is to provide a process which produces a hydroxyalkylated phenol product which requires little or no purification. These and other objects will become apparent to those skilled in the art from the following description and claims.

It has now been found that phenols can be hydroxyalkylated by reacting a hydroxy aromatic compound of the benzene series (a phenol) with an alkylene carbonate in the presence of a catalytic amount of an alkali metal hydride such as lithium, potassium or sodium hydride. The reaction proceeds smoothly at temperatures of from 140° to 200° C. with the formation of the desired product and evolution of carbon dioxide of reaction. Good results are obtained when the reactants are employed in equivalent proportions and the catalyst is employed in an amount of between 0.025 percent and 0.1 percent by weight of the reaction mixture. Upon completion of the reaction the desired product can be readily obtained by simple separation techniques to separate the catalyst from the desired product.

In carrying out the process of the present invention the phenol, alkylene carbonate and catalyst are mixed or otherwise blended together and the resulting mixture heated to between about 140 and 200° C. and preferably between 160° and 170° C. and held thereat for a period of time to complete the reaction. Upon completion of the reaction, as evidenced by the evolution of between about 95 percent and 98 percent of the theoretical amount of carbon dioxide of reaction, the reaction is stopped by inactivation of the catalyst. The inactivation of catalyst can conveniently be accomplished by conventional means such as mechanical separation or chemical neutralization of the catalyst. This latter operation results in the yield of the desired product in a usable form without further purification.

The following examples are illustrative of the present invention but are not to be construed as limiting.

*Example 1*

2.2 moles of ethylene carbonate was mixed with 1 mole of 2,2'-bis(p-hydroxyphenyl)propane and the resulting mixture heated and purged with nitrogen until the mixture melted. The purge was thereafter stopped and 0.05 percent by weight of the mixture of lithium hydride was added thereto and the temperature of the resulting mixture slowly raised to 165° C. During this latter period carbon dioxide gas was evolved and vented from the reaction zone. When 98 percent of the theoretical gas had been evolved, the reaction mass was filtered to inactivate the catalyst by removing it from the reaction zone and thus stop the reaction. The filtrate, 1,1'-isopropylidene bis(p-phenyleneoxy)di-2-ethanol was solidified on a flaker drum and was found to melt at 105° to 113° C.

In a manner similar to the foregoing example other hydroxyalkylated phenols may be prepared, for example:

1,1'-isopropylidenebis(p-phenyleneoxy)di-2-propanol by reacting together 2,2-(p-hydroxyphenyl)propane, propylene carbonate and lithium hydride;

Trimethylenebis(p-phenyleneoxy)di-2-butanol by reacting together trimethylene bisphenol, 1,2-butylene carbonate and lithium hydride;

1,1' - isopropylidenebis(2,3,5,6-tetrachloro-4-phenyleneoxy)di-2-ethanol by reacting together 2,3,5,6-tetrachloro-4-phenylene propane, ethylene carbonate and lithium hydride.

Substitution of one of the following phenols for the phenol employed in Example 1 results in the formation of the corresponding hydroxyalkylated phenol: p,p'-biphenol, p,p'-sec-butylidene diphenol, 4,4'-isopropylidenebis(o-cresol), 4,4'-isopropylidenebis(2-phenylphenol), o-chloro-phenol, o-cresol, phenol, p-propylphenol, p-bis(o-cresol) and the like.

It is thus to be understood that the process of the present invention is susceptible of employment for the preparation of hydroxyalkylated phenols whether the phenol be substituted or not.

Further, that in accordance with the present invention alkylene carbonates having the appropriate carbonate moiety in substantially any adjacent positions are also included in the scope of the present invention, such as ethylene carbonate, propylene carbonate, 1,2- or 2,3-butylene carbonate, phenylethylene carbonate and the like. While lithium hydride has been employed in the present invention it is to be understood that sodium hydride or potassium hydride may be employed as the catalyst.

I claim:
1. A process which comprises the steps of reacting a phenol with a 1,2-alkylene carbonate in the presence of from about 0.025 to about 0.10 percent by weight, a catalytic amount, of an alkali metal hydride to obtain a O-(hydroxyalkylated)phenol product.

2. A process for the preparation of O-(hydroxyalkylated)phenols which comprises reacting a phenol with a 1,2-alkylene carbonate in the presence of from about 0.025 to about 0.10 percent by weight of lithium hydride catalyst.

3. In a process for the preparation of O-(hydroxyalkylated)phenols the step which comprises reacting a phenol with a 1,2-alkylene carbonate in the presence of from about 0.025 to about 0.1 percent by weight of lithium hydride as a catalyst and at a temperature of from about 140° to about 200° C. until between about 95 and 98 percent of the theoretical amount of carbon dioxide of reaction has been evolved.

References Cited in the file of this patent
UNITED STATES PATENTS
2,448,767 Carlson _____ Sept. 7, 1948
FOREIGN PATENTS
938,012 Germany _____ Jan. 19, 1956